Aug. 14, 1928.
O. STEINER
1,680,702
ELECTRIC CONDENSER
Filed July 19, 1926
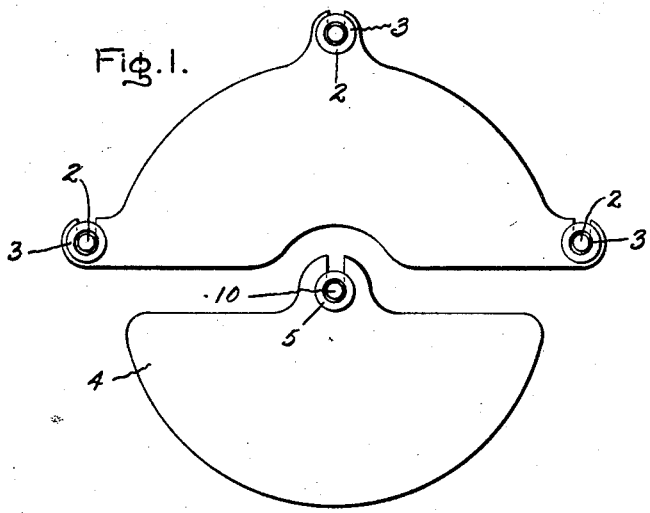
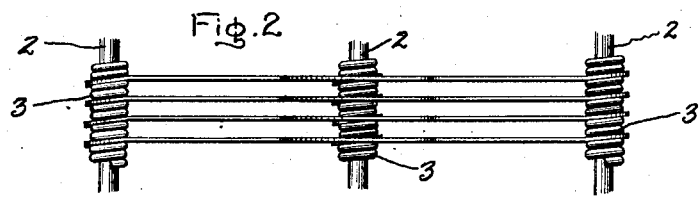
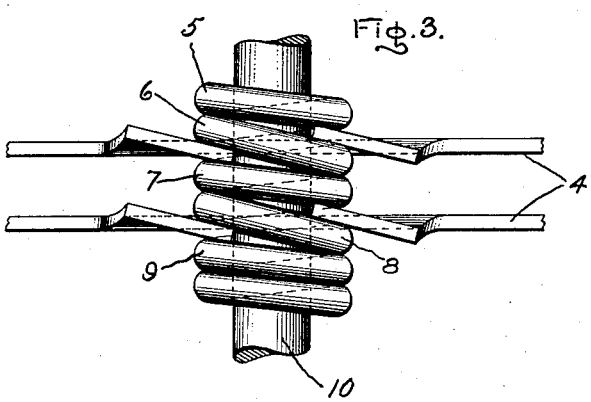
Inventor:
Oscar Steiner,
by
His Attorney.

Patented Aug. 14, 1928.

1,680,702

UNITED STATES PATENT OFFICE.

OSCAR STEINER, OF PHILADELPHIA, PENNSYLVANIA, ASSIGNOR TO GENERAL ELECTRIC COMPANY, A CORPORATION OF NEW YORK.

ELECTRIC CONDENSER.

Application filed July 19, 1926. Serial No. 123,422.

My invention relates to electric condensers. One of the objects of my invention is to provide a condenser of improved and novel construction; another object is to provide a condenser in which the plates are supported between the convolutions of a coiled spring; and a further object is to provide a condenser of comparatively inexpensive construction.

The invention will be more readily understood by referring to the accompanying drawing, specification and claims.

In the drawing Fig. 1 shows the rotor and stator elements of an adjustable condenser involving the principles of my invention and located in operative relation.

Fig. 2 shows a section of the stator in front elevation.

Fig. 3 shows a section of the rotor in front elevation.

Referring more in detail to the drawing, it will be seen that the plates of the stator of the condenser, Fig. 1, are held in position by suitable bolts 2. Around each of the bolts I provide a coiled spring 3. Between the convolutions of these springs the plates are inserted as shown. Each plate is provided with a set of slots corresponding to the bolts 2. It will be seen that the regions of each plate which are inserted between the convolutions of the spring are warped into helical form in order to adapt them to be properly received between the convolutions of the spring. This construction is more clearly shown in Fig. 3. In this figure the plates 4 of the rotor are shown warped into helical form to engage between the convolutions 5, 6, 7, 8 and 9 of the spring. This spring it will be seen is wound about the shaft 10 of the rotor.

A condenser of this type can be very easily formed and assembled with a minimum amount of material and labor.

It will be understood that while I have illustrated my invention in connection with the specific forms of the drawings, and in view of the description, it is obvious that my invention may be utilized in connection with other modifications without departing from the scope of the claims contained herein.

What I claim as new and desire to secure by Letters Patent of the United States, is,—

1. In an electric condenser, a spring having a number of convolutions coiled about an axis, a plurality of spaced metal plates, each of which is held in place between the different convolutions of the spring.

2. In an electric condenser, a spring having a number of convolutions coiled about an axis, a plurality of metal plates spaced from each other, each of which is held in position by being inserted between different convolutions of the coiled spring, the edge of each plate in the region of support being helical.

3. An electric condenser comprising a plurality of spaced metal plates, a support for said plates comprising a stem and a spring having a number of convolutions coiled about said stem, said plates being inserted between different convolutions of the spring.

4. A electric condenser comprising a plurality of spaced metal plates, a support for said plates comprising a stem and a spring having a number of convolutions coiled about said stem, said plates being inserted between the convolutions of the spring, the edge of each plate being bent to fit in between said convolutions.

In witness whereof, I have hereunto set my hand July 14th, 1926.

OSCAR STEINER.